United States Patent [19]
Hagen et al.

[11] 3,765,171
[45] Oct. 16, 1973

[54] COMBUSTION CHAMBER FOR GAS TURBINE ENGINES

[75] Inventors: Hermann Hagen, Dachau; Peter Tartaglio; Adolf Fehler, both of Puchheim, all of Germany

[73] Assignee: Motoren-und Turbinen-Union Munich GmbH, Munich, Germany

[22] Filed: Mar. 11, 1971

[21] Appl. No.: 123,164

[30] Foreign Application Priority Data
Apr. 27, 1970 Germany.................. P 20 20 416.4

[52] U.S. Cl. ........................... 60/39.23, 60/39.51 R
[51] Int. Cl. ............................ F02c 9/14, F02c 7/10
[58] Field of Search ...................... 60/39.23, 39.65, 60/39.51 R, 39.29

[56] References Cited
UNITED STATES PATENTS

| | | | |
|---|---|---|---|
| 2,482,394 | 9/1949 | Wyman | 60/39.23 |
| 2,621,477 | 12/1952 | Powter | 60/39.23 |
| 2,655,787 | 10/1953 | Brown | 60/39.23 |
| 2,770,096 | 11/1956 | Fox | 60/39.23 |
| 2,837,893 | 6/1958 | Schirmer | 60/39.23 |
| 3,078,672 | 2/1963 | Meurer | 60/39.65 |
| 3,577,878 | 5/1971 | Greenwood | 60/39.23 |
| 3,584,459 | 6/1971 | Amann | 60/39.51 R |

Primary Examiner—Douglas Hart
Attorney—Craig, Antonelli, Stewart & Hill

[57] ABSTRACT

Combustion chamber for gas turbine engines including a flame tube provided with metering openings for introduction of secondary air into the flame tube, a throttle ring which is axially or circumferentially moveable to adjust the size of the metering openings, and control means for actuating the throttle ring in response to temperature or pressure conditions in the engine.

30 Claims, 6 Drawing Figures

PATENTED OCT 16 1973　　　　　　　　　　3,765,171

COMBUSTION CHAMBER FOR GAS TURBINE ENGINES

This invention relates to a combustion chamber for gas turbine engines, the flame tube of which is equipped with openings for the introduction of secondary air.

The introduction of secondary air into the combustion zone of the combustion chamber serves to supplement the air quantity required for the combustion process. As a matter of fact, in a gas turbine engine the compressor delivery pressure increases as a function of the increasing speed, thus resulting in an increase of the combustion air supplied by the compressor to the combustion chamber, which again results in an increase of fuel to be supplied to the combustion chamber. Even with the background of these generally known conditions, it is still a problem to design a combustion chamber with excellent properties over a wide operating range with respect to combustion efficiency, pressure losses and ignition and flame-out behavior.

In order to obtain reliable ignition of the fuel/air mixture in the combustion chamber primary zone and, moreover, a relatively satisfactory combustion chamber efficiency under off-design conditions of the gas turbine engine, the metering sections for primary and secondary air of known combustion chambers have been relatively small. This measure, however, resulted in higher pressure losses within the full load range of the gas turbine engine.

Moreover, it might be possible that even those relatively small metering sections of known combustion chambers are too large to ensure reliable ignition of the fuel/air mixture and a satisfactory combustion efficiency of the combustion chamber during the engine starting cycle, since the velocity of the inflowing primary air is very low during the starting cycle. This applies particularly to combustion chambers of gas turbine engines which are equipped with a heat exchanger.

Therefore, it is the objective of the invention to propose a combustion chamber which features excellent properties over the total operating range of a gas turbine engine, with respect to combustion efficiency, pressure losses, particularly under full load conditions, as well as a satisfactory ignition and flame-out behavior.

As a solution to this problem, the invention proposes for a combustion chamber of the initially mentioned type that the metering sections for the secondary air be variable. According to the invention, the metering sections vary as a function of the compressor delivery pressure or the combustion chamber inlet pressure, respectively.

According to the invention, it is possible, e.g., during the starting cycle of a gas turbine engine, to close the metering sections for the secondary air partially or completely, thus increasing the primary air quantity. This has a favorable effect on the ignition behavior and the combustion chamber efficiency and causes a greater fuel quantity to be supplied during the acceleration cycle so that the nominal speed of the gas turbine engine can be achieved within a shorter period. With increasing speed and, thus, rising compressor delivery pressure, the metering sections for the secondary air may be enlarged continuously, so that, with corresponding dimensioning of the metering sections, the pressure loss under full load conditions of the gas turbine engine can be kept very low.

Especially for gas turbines equipped with a heat exchanger, the variation of the metering sections for the secondary air as a function of pressure parameters may be inadequate under some operating conditions. This is due to the fact that the specific volume of the secondary air is a function of temperature and that this air is heated by the heat exchanger to considerably differing temperatures over the operating range.

In order to improve the control of the secondary air flow, it is proposed by the invention to vary the secondary air metering sections as a function of the combustion chamber inlet temperature.

For high air temperature and consequently great specific volume, the metering sections are fully opened in order to allow sufficient secondary air to flow into the combustion chamber for combustion, while, on the other hand, the secondary air metering sections are reduced for low inlet temperatures. As an additional advantage, the primary air is controlled in such a manner that the primary air flow increases with decreasing air temperature. If only a small quantity of the total compressor delivery air is used as secondary air, the primary air flow will increase and vice versa.

In an advantageous embodiment of the invention, the quotient or the difference as obtained by the air temperature upstream of the heat exchanger and of the combustion chamber, may be used as a control parameter for the variation of the secondary air metering sections. In addition, it is possible to use the difference or the quotient as obtained by the air temperatures upstream of the combustion chamber and at the turbine inlet as a control parameter, the turbine inlet temperature being either the actually measured value or nominal value to be set.

The variation of the secondary air metering sections is effected by a throttle ring, surrounding the flame tube and moveable in the axial or circumferential direction. Such a throttle ring is of simple design and a safe and reliable component.

In accordance with a further proposal, the throttle ring may also be movable by means of an actuating element, such as a spring-loaded piston. The compressor delivery pressure or the combustion chamber inlet pressure, respectively, being used as control parameters for the metering sections, will thus actuate this piston.

As an alternative, the throttle ring can also be moved by an actuator via an actuating linkage. This actuator receives the control signals for a measuring transformer into which the air temperature is fed as the control parameter.

According to a further proposal, the throttle ring may also be moved by mechanically connecting it to temperature-sensitive actuating elements which are arranged directly in the incoming air stream. This design is most economic because of the double function of the actuating elements as temperature sensors and actuators.

If the available space within the combustion chamber is limited, according to the invention, the throttle elements varying the secondary air metering sections are to be designed as bi-metal elements. This solution may be considered the most simple design, since temperature sensors and throttle elements are identical.

According to a further proposal, the variation of the secondary air metering sections is also to be employed for annular combustion chambers. In this case, it would be advantageous to arrange the temperature sensors in separate air ducts in order to eliminate the influence of the radiation heat of the combustion chamber upon these sensors.

These and other objects features and advantages of the present invention will become more apparent from the following detailed description when taken in conjunction with the accompanying drawings, wherein.

Figure 1:
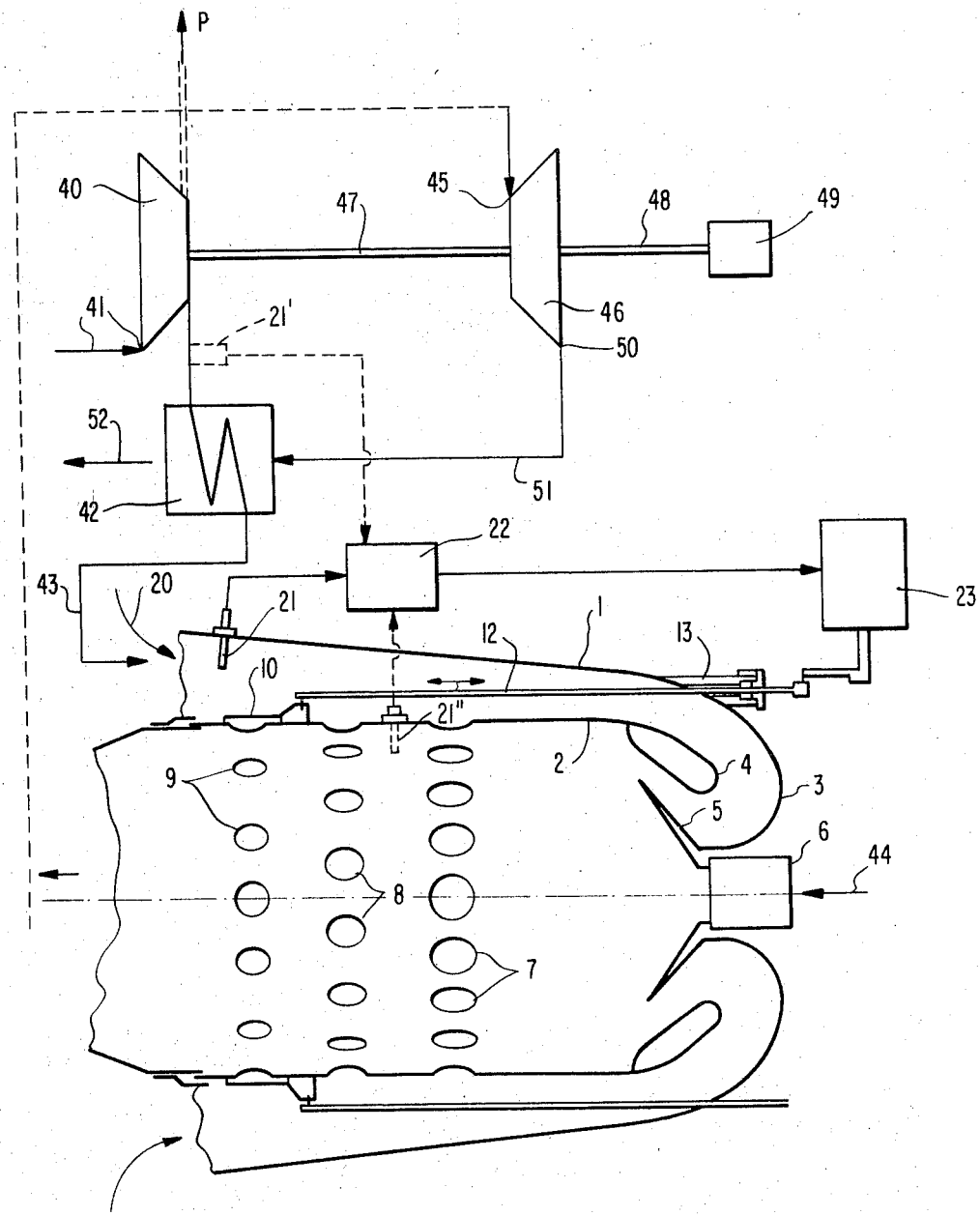
FIG. 1 is a schematic diagram of a combustion chamber with a throttle ring for the variation of the secondary air metering sections as a function of temperature and the gas turbine engine into which this combustion chamber is incorporated.

FIG. 1 is a schematic drawing of a gas turbine engine with a combustion chamber in accordance with the invention. The air entering compressor 40 at point 41 is compressed and then heated in heat exchanger 42; after which it flows through duct 43 into the combustion chamber, where it is mixed with fuel entering the combustion chamber at point 44 and burned. The combustion gases enter turbine 46 at point 45. The turbine is connected to compressor 40 via shaft 47, and to power turbine 49 via shaft 48. The turbine exhaust gases are discharged at point 50 and are routed through duct 51 to heat exchanger 42 and heat the compressor delivery air. At point 52, the exhaust gases are discharged to atmosphere from the heat exchanger.

The combustion chamber is a can-type reverse flow version with an outer casing 1, a flame tube 2 into which the primary air is introduced via a flow reversal duct 3 and an associated baffle ring 4. Fuel nozzle 6 is arranged in the center of cone 5, inside the flow reversal duct. Primary air hole series 7 facing the spray cone 5 are arranged in flame tube 2. For the secondary air, further holes, i.e., secondary air hole series 8 and 9, are similarly arranged. Around the outer diameter of flame tube 2, a throttle ring 10 serving as a metering means is arranged which closes one of secondary air hole series 8 and 9. In accordance with the embodiment as shown in FIG. 1, the actuation of this throttle ring 10 as a function of the combustion chamber air inlet temperature by suitable control means causes the partial or complete opening of the secondary air hole series. At point 20 at the combustion chamber inlet, temperature sensor 21 records this temperature, transmits it to measuring transformer 22 which in turn generates a control signal to actuator 23. Also, the ratio or the difference between the heat exchanger inlet temperature and combustion chamber inlet temperature may be used as a control parameter. A temperature sensor 21' is schematically shown in dash lines in FIG. 1 for sensing the temperature between the compressor and the heat exchanger for supplying a signal to transformer 22. Also shown schematically in dash lines in FIG. 1 is a temperature sensor 21'' for sensing the temperature in the combustion chamber and supplying a corresponding signal to the transformer 22. Actuation of throttle ring 10 is effected via an actuating means including one or several actuating rods 12 which pass through outer casing 1 via one or several gland-type fittings 13 to the outside and are connected to actuator 23. If several rods 12 are used, an undesirable tilting of throttle ring 10 can be avoided.

Figure 2:
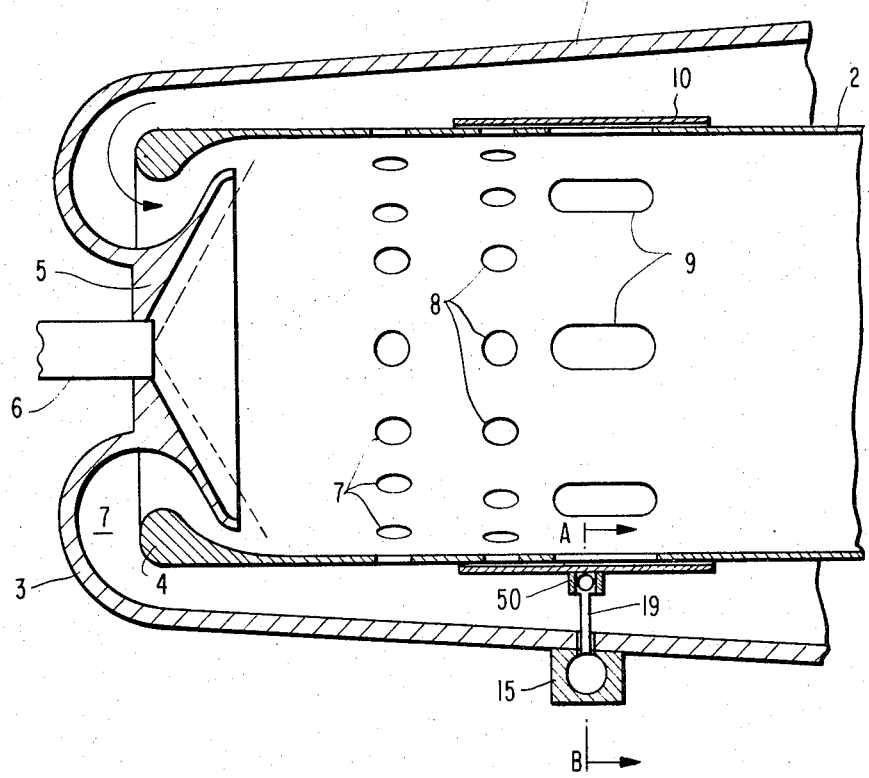
FIG. 2 is a longitudinal sectional view of a combustion chamber according to the invention with a throttle ring which is controlled as a function of compressor delivery pressure.
Figure 3:
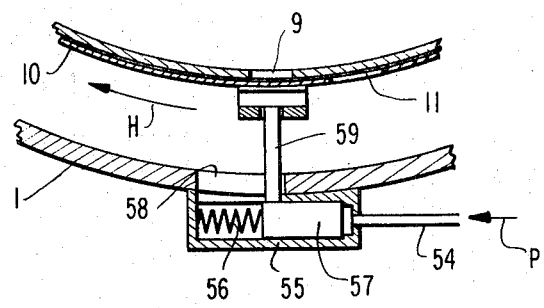
FIG. 3 is a section taken along line A – B of FIG. 2.

The combustion chambers as shown in FIG. 2 is similar to that of FIG. 1. Reference number 8 identifies circular metering sections or openings and reference number 9 identifies longitudinal metering sections or openings for the introduction of part of the secondary air flowing into flame tube 2. The secondary air can only flow into the flame tube via metering sections 8 and 9 when throttle ring 10, movable in a circumferential direction and arranged around the flame tube (5) outer diameter, reaches a position where its associated holes, e.g., 11 (FIG. 3) coincide with and thus open metering sections 9. The same applies to the circular holes of throttle ring 10 (not shown in the drawing) which may, if required, and corresponding to the throttle ring actuation, open metering sections 8 partially or completely. The actuation of throttle ring 10 does not influence metering sections 7 of flame tube 2.

Moveable piston 57 in housing 55, actuated by the increasing compressor delivery pressure (arrow P, FIG. 3) via line 54 and counteracting the force of reset spring 56, is connected to actuating member 59 arranged movably in longitudinal hole 58 of outer casing 1, which engages into bracket 50 (FIG. 2) of throttle ring 10. By this arrangement, metering sections 8 and 9 are variable as a function of the compressor delivery pressure, and can be closed completely if required.

Figure 4:
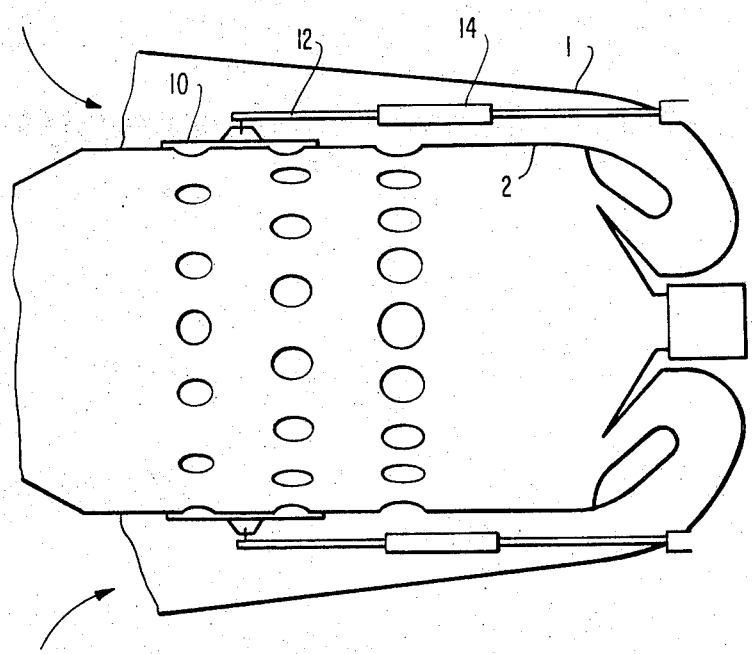
FIG. 4 is a diagram of a combustion chamber according to FIG. 1, where the throttle ring is moved by means of a bi-metal element which is arranged in the secondary air stream.

FIG. 4 shows a combustion chamber, the primary features of which are similar to that shown in FIG. 1. The only difference is that a temperature-sensitive actuating element 14 is installed in actuating rod 12 within outer casing 1 in the stream of the incoming air. This actuating element may be a bi-metal element which causes the throttle ring to move into its opening position with increasing temperature, or a pneumatically operated piston, its variation in length as a function of temperature causing the actuation of throttle ring 10.

Figure 5:
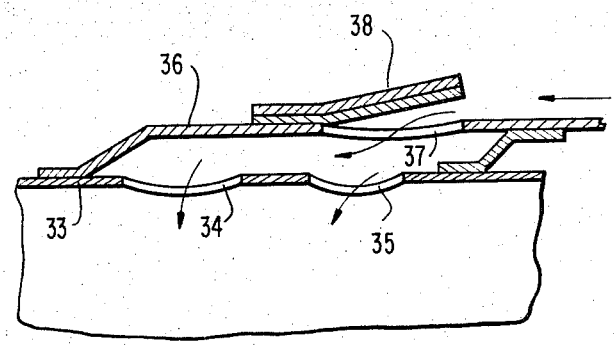
FIG. 5 is a partial view in section of a combustion chamber, where a bi-metal strip is provided as the throttle for the secondary air metering sections.

FIG. 5 shows a secondary air flow control which can be used for a great number of combustion chamber configurations. Secondary air metering sections or openings 34 and 35 in flame tube 33 are closed by outer flow duct 36 with holes 37, which are covered by bi-metal flaps 38. The flaps are so designed that they open upon increasing inlet temperature.

Figure 6:
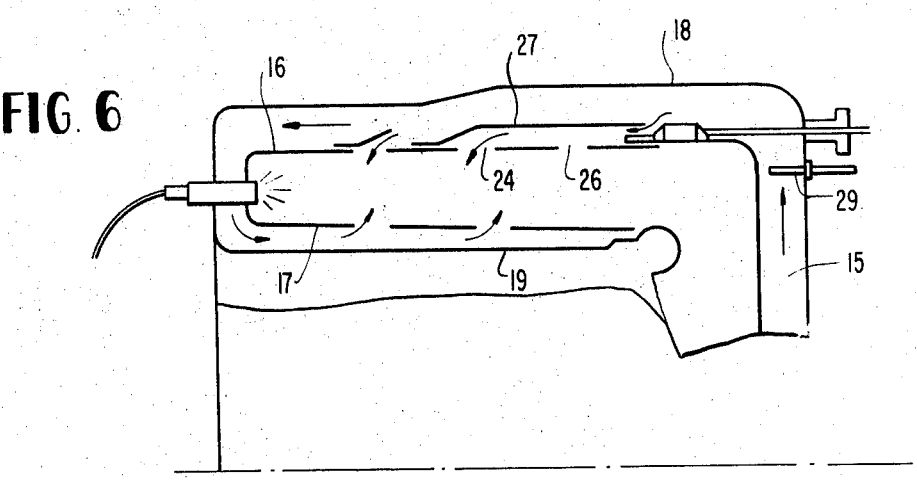
FIG. 6 is a partial schematic view of an annular combustion chamber with variable secondary air metering sections.

FIG. 6 shows an annular combustion chamber, where the air delivered by the compressor is routed into a separate duct. The combustion chamber is formed by outer flame tube 16 and inner flame tube 17. The air is introduced between outer casing 18 and inner combustion chamber casing 19. A cylindrical sheet metal tube 27 is provided at the outer circumference of outer flame tube 16. In the intermediate space between this tube and the outer flame tube air is supplied to secondary air hole series 24 and 26. The air flow into tube 27 is controlled by an axially variable throttle ring. The throttle ring actuation is as described above. Temperature sensor 29 installed in duct 15 senses the combustion chamber inlet air temperature.

Actuator 23 (FIG. 1) can also be controlled by the compressor delivery pressure. All arrangements as shown in FIGS. 1 – 6 can be employed with various combinations which are not specifically illustrated or described for simplicity and clarity of disclosure.

Within the scope of the present invention, a combined control of the secondary air metering sections as a function of pressure and temperature is also to be considered.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. Combustion chamber for gas turbine engines having a compressor, comprising a flame tube provided with metering openings for introduction of secondary air into the flame tube, metering means for selectively varying the opening of said metering openings to control the amount of secondary air permitted to enter said flame tube through said metering openings, a heat exchanger connected between said compressor and said combustion chamber, and control means responsive to a relationship between the air temperature upstream of said heat exchanger and the air temperature of the combustion chamber for actuating said metering means to adjust said metering openings.

2. Combustion chamber as defined in claim 1, wherein said control means is responsive to the difference between the air temperature upstream of said heat exchanger and the air temperature of the combustion chamber.

3. Combustion chamber as defined in claim 1, wherein said control means is responsive to the ratio of the air temperature upstream of said heat exchanger and the air temperature of the combustion chamber.

4. Combustion chamber for gas turbine engines having a compressor, comprising a flame tube provided with metering openings for introduction of secondary air into the flame tube, metering means for selectively varying the opening of said metering openings to control the amount of secondary air permitted to enter said flame tube through said metering openings, and control means for actuating said metering means to adjust said metering openings, said metering means including a throttle ring arranged around said flame tube and being movable to selectively open and close said metering openings, wherein said control means includes an actuating element connected to said throttle ring in the form of a spring-loaded piston and means for displacing said piston.

5. Combustion chamber for gas turbine engines having a compressor, comprising a flame tube provided with metering openings for introduction of secondary air into the flame tube, metering means for selectively varying the opening of said metering openings to control the amount of secondary air permitted to enter said flame tube through said metering openings, and control means for actuating said metering means to adjust said metering openings, said metering means including a throttle ring arranged around said flame tube and being movable to selectively open and close said metering openings, wherein said control means includes an actuating element connected to said throttle ring and a temperature sensitive element connected to said actuating element and positioned in the stream of intake air flowing to said flame tube displacing said actuating element with changes in air temperature.

6. Combustion chamber for gas turbine engines having a compressor, comprising a flame tube of annular configuration provided with metering openings for introduction of secondary air into the flame tube, metering means for selectively varying the opening of said metering openings to control the amount of secondary air permitted to enter said flame tube through said metering openings, separate ducts for the introduction of secondary air to said metering openings, and control means for actuating said metering means to adjust said metering openings including temperature sensors positioned in said separate ducts.

7. Combustion chamber as defined in claim 6, wherein said control means includes actuating means for effecting axial movement of said throttle ring.

8. Combustion chamber as defined in claim 6, wherein said control means includes actuating means for effecting circumferential movement of said throttle ring.

9. A combustion chamber according to claim 4, wherein said means for displacing said piston includes means communicating the compressor delivery pressure directly with said piston.

10. A combustion chamber for gas turbine engines of the type having a compressor, comprising a flame tube provided with metering openings for introducing secondary air into the flame tube, metering means for selectively varying the effective area of said metering openings to meter the amount of secondary air permitted to enter said flame tube, and control means responsive to one of the compressor delivery pressure and the combustion chamber inlet temperature for controlling said metering means, wherein said combustion chamber inlet temperature is sensed by temperature sensing means having air temperature responsive elements, and wherein said temperature sensing means are disposed in combustion air supply passage means leading to said flame tube in such a manner that all of said temperature responsive elements are spaced from external walls of said flame tube which form a combustion space in said flame tube.

11. A combustion chamber according to claim 10, wherein primary air openings are provided in said flame tube upstream of said metering openings with respect to said flow of air in said flame tube.

12. Combustion chamber according to claim 10, wherein said control means is directly responsive to said combustion chamber inlet temperature for controlling said metering means.

13. Combustion chamber according to claim 10, wherein said control means is directly responsive to said compressor delivery pressure for controlling said metering means.

14. A combustion chamber for gas turbine engines of the type having a compressor, comprising a flame tube provided with metering openings for introducing secondary air into the flame tube, metering means for selectively varying the effective area of said metering openings to meter the amount of secondary air permitted to enter said flame tube, control means responsive to one of the compressor delivery pressure and the combustion chamber inlet temperature for controlling said metering means, a fuel nozzle adjacent one end of said flame tube for supplying fuel to the interior of said flame tube, and an outer casing surrounding said flame tube with a space therebetween, wherein combustion air is conducted from the outlet of said compressor to a position in the interior of said flame tube adjacent said fuel nozzle by way of said space between said outer casing and flame tube, and wherein said metering openings communicate directly with said space at a position upstream of said fuel nozzle with respect to the flow in said space and downstream of said fuel nozzle with respect to the flow in said flame tube.

15. Combustion chamber according to claim 14, wherein said control means is directly responsive to the temperature of the air in said space at a position upstream of said metering openings with respect to the flow in said space.

16. Combustion chamber according to claim 14, wherein said control means is directly responsive to said compressor delivery pressure for controlling said metering means.

17. Combustion chamber according to claim 15, further comprising a heat exchanger positioned between said compressor and said space.

18. Combustion chamber according to claim 17, wherein said control means is responsive to a relationship between the air temperature upstream of said heat exchanger and the air temperature of the combustion chamber for controlling said metering means.

19. Combustion chamber according to claim 14, wherein said metering means includes a throttle ring arranged around said flame tube and which is movable to selectively open and close said metering openings.

20. Combustion chamber according to claim 19, said control means including actuating means for effecting axial movement of said throttle ring.

21. Combustion chamber according to claim 19, wherein said control means includes actuating means for effecting circumferential movement of said throttle ring.

22. Combustion chamber according to claim 19, wherein said control means includes an actuating element connected to said throttle ring in the form of a spring-loaded piston and means for displacing said piston.

23. Combustion chamber according to claim 19, wherein said control means includes an actuating element connected to said throttle ring and a temperature sensitive element connected to said actuating element and positioned in the stream of intake air flowing to said flame tube for displacing said actuating element with changes in air temperature.

24. Combustion chamber according to claim 10, wherein said metering means includes a throttle ring arranged around said flame tube and which is movable to selectively open and close said metering openings.

25. Combustion chamber according to claim 24, wherein said control means includes actuating means for effecting axial movement of said throttle ring.

26. Combustion engine according to claim 24, wherein said control means includes actuating means for effecting circumferential movement of said throttle ring.

27. A combustion chamber for gas turbine engines of the type having a compressor, comprising a flame tube provided with metering openings for introducing secondary air into the flame tube, metering means for selectively varying the effective area of said metering openings to meter the amount of secondary air permitted to enter said flame tube, and control means responsive to one of the compressor delivery pressure and the combustion chamber inlet temperature for controlling said metering means, wherein said metering means includes a throttle ring arranged around said flame tube and which is movable to selectively open and close said metering openings, wherein said control means includes an actuating element connected to said throttle ring in the form of a spring-loaded piston and means for displacing said piston.

28. A combustion chamber for gas turbine engines of the type having a compressor, comprising a flame tube provided with metering openings for introducing secondary air into the flame tube, metering means for selectively varying the effective area of said metering openings to meter the amount of secondary air permitted to enter said flame tube, and control means responsive to one of the compressor delivery pressure and the combustion chamber inlet temperature for controlling said metering means, wherein said metering means includes a throttle ring arranged around said flame tube and which is movable to selectively open and close said metering openings, wherein said control means includes an actuating element connected to said throttle ring and a temperature sensitive element connected to said actuating element and positioned in the stream of intake air flowing to said flame tube for displacing said actuating element with changes in air temperature.

29. Combustion chamber as defined in claim 6, wherein said metering means includes a throttle ring arranged around said flame tube which is movable to selectively open and close said metering openings, and wherein said control means includes actuating means for effecting axial movement of said throttle ring.

30. Combustion chamber as defined in claim 6, wherein said metering means includes a throttle ring arranged around said flame tube which is movable to selectively open and close said metering openings, and wherein said control means includes actuating means for effecting circumferential movement of said throttle ring.

* * * * *